(12) United States Patent
Banerjee

(10) Patent No.: US 9,937,686 B2
(45) Date of Patent: Apr. 10, 2018

(54) MULTILAYER BARRIER FILM, LAMINATES AND PROCESS THEREOF

(71) Applicant: Essel Propack Ltd., Mumbai (IN)

(72) Inventor: Mrinal Kanti Banerjee, Mumbai (IN)

(73) Assignee: ESSEL PROPACK LIMITED, Mumbai (IN)

( * ) Notice: Subject to any disclaimer, the term of this patent is extended or adjusted under 35 U.S.C. 154(b) by 836 days.

(21) Appl. No.: 14/356,538

(22) PCT Filed: Nov. 7, 2012

(86) PCT No.: PCT/IB2012/002257
§ 371 (c)(1),
(2) Date: May 6, 2014

(87) PCT Pub. No.: WO2013/068809
PCT Pub. Date: May 16, 2013

(65) Prior Publication Data
US 2015/0158278 A1 Jun. 11, 2015

(30) Foreign Application Priority Data
Nov. 8, 2011 (IN) .......................... 3163/MUM/2011

(51) Int. Cl.
*B32B 27/34* (2006.01)
*B32B 27/08* (2006.01)
(Continued)

(52) U.S. Cl.
CPC .......... *B32B 27/08* (2013.01); *B29C 47/0004* (2013.01); *B29C 47/0045* (2013.01); *B29C 47/0064* (2013.01); *B29C 47/02* (2013.01); *B29C 47/021* (2013.01); *B29C 47/022* (2013.01); *B29C 47/025* (2013.01);
(Continued)

(58) Field of Classification Search
CPC .. B32B 1/02; B32B 1/08; B32B 27/30; B32B 27/306; B32B 27/32; B32B 27/27; B32B 27/34; B29C 47/0004; B29C 47/0045; B29C 47/0064; B29C 47/02; B29C 47/021; B29C 47/022; B29C 47/025; B29C 47/04
See application file for complete search history.

(56) References Cited

U.S. PATENT DOCUMENTS 6,194,040 B1    2/2001 Delius et al.
6,379,812 B1 *  4/2002 Hofmeister ............ B32B 27/28
                                                  428/34.1

(Continued)

OTHER PUBLICATIONS

International Search Report received in PCT Application No. PCT/162012/002257 dated Mar. 22, 2013.

*Primary Examiner* — Walter B Aughenbaugh
(74) *Attorney, Agent, or Firm* — Brinks Gilson & Lione

(57) ABSTRACT

The present disclosure relates to a multi-layer barrier film comprising: a first layer of an ethylene vinyl alcohol (EVOH) layer or a polyamide layer having a thickness in the range of 3 micron to 15 micron; a second layer of a polyamide layer having a thickness in the range of 3 micron to 15 micron in contact with the first layer; and a third layer of an ethylene vinyl alcohol (EVOH) layer having a thickness in the range of 3 micron to 15 micron.
The present disclosure also relates to a multi-layered laminate comprising the multi-layer barrier film, and the process of making the same.

21 Claims, 2 Drawing Sheets

(51) Int. Cl.

| | | |
|---|---|---|
| *B32B 27/32* | (2006.01) | |
| *B32B 27/30* | (2006.01) | |
| *B32B 1/02* | (2006.01) | |
| *B29C 47/00* | (2006.01) | |
| *B29C 47/02* | (2006.01) | |
| *B29C 47/04* | (2006.01) | |
| *B29C 47/06* | (2006.01) | |
| *B32B 1/08* | (2006.01) | |
| *B32B 37/15* | (2006.01) | |
| *B29L 7/00* | (2006.01) | |

(52) U.S. Cl.
CPC ............ *B29C 47/04* (2013.01); *B29C 47/065* (2013.01); *B32B 1/02* (2013.01); *B32B 1/08* (2013.01); *B32B 27/30* (2013.01); *B32B 27/306* (2013.01); *B32B 27/32* (2013.01); *B32B 27/327* (2013.01); *B32B 27/34* (2013.01); *B32B 37/153* (2013.01); *B29L 2007/008* (2013.01); *B32B 2270/00* (2013.01); *B32B 2307/402* (2013.01); *B32B 2307/71* (2013.01); *B32B 2307/7244* (2013.01); *B32B 2307/7248* (2013.01); *B32B 2439/00* (2013.01); *B32B 2439/40* (2013.01); *Y10T 428/1334* (2015.01); *Y10T 428/269* (2015.01)

(56) References Cited

U.S. PATENT DOCUMENTS

| | | | |
|---|---|---|---|
| 6,406,763 | B1 * | 6/2002 | Wolf .................. B32B 27/32 |
| | | | 426/112 |
| 7,794,848 | B2 | 9/2010 | Breese |
| 9,193,509 | B2 * | 11/2015 | Abhyankar ............ B32B 15/08 |
| 9,486,987 | B2 * | 11/2016 | Banerjee ................ B32B 27/32 |
| 2002/0168489 | A1 | 11/2002 | Ting et al. |
| 2003/0100685 | A1 | 5/2003 | Farkas |
| 2007/0160806 | A1 | 7/2007 | Nakamura |
| 2010/0015423 | A1 | 1/2010 | Schaefer et al. |
| 2010/0151218 | A1 | 6/2010 | Curie et al. |

* cited by examiner

MULTILAYER BARRIER FILM, LAMINATES AND PROCESS THEREOF

RELATED APPLICATIONS

The present patent document is a 371 national phase application of PCT Application Serial No. PCT/IB2012/002257, filed November, 2012, designating the United States and published in English, which claims priority from Indian Provisional Application No. 3163/MUM/2011, filed on Nov. 8, 2011. All of the foregoing applications are hereby incorporated by reference.

TECHNICAL FIELD

The present subject matter relates to a multi-layer barrier film, laminate thereof, and the process of making the same.

The present subject matter further relates to laminated products, such as laminated tubes with the multi-layer barrier film which have excellent aroma barrier, UV resistance, oxygen barrier and mechanical properties and being economical as well.

BACKGROUND

Laminated tubes are used for packaging across the globe in varied sectors such as oral care, food, cosmetics, pharma and industrial applications. Films used for the packaging of food generally contain multiple layers, in which each layer adds certain desired physical or chemical properties to the completed film. "Barrier" layer serve to protect the packaged product from physical stresses caused by the normal handling of the product during packaging, shipping, or during commercialization. In addition, a heat sealant layer may be utilized to bond films together to form packages for products, such as pharmaceutical or food products. Further, the combination of layers may allow for a film that has favorable physical properties, such as, for example, strength, stiffness, abrasion and chemical resistance.

One such layer that may be utilized as a barrier layer and to increase the toughness of films made therefrom is a layer comprising polyamide. Polyamide is a high molecular weight polymer having amide linkages along the molecular chain structure. Nylon polyamides, which are synthetic polyamides, have favorable physical properties of high strength, stiffness abrasion and chemical resistance.

It is, of course, generally known to provide multilayer polymeric films that may have high strength, stiffness, abrasion resistance and/or chemical. Many such films may have a barrier layer of ethylene-vinyl alcohol copolymer (EVOH). The exclusive use of ethylene-vinyl alcohol (EVOH) as the barrier layer increases the cost besides increasing the thickness of the layer in the laminate. The use of ethylene-vinyl alcohol (EVOH) sandwiched by layers comprising of nylon polyamide provide reduced core thickness, and also reduction in price. The barrier films made up of polyamide-ethylene-vinyl alcohol (EVOH)-polyamide combination, polyamide interferes with the flavor ingredient of the product.

The other barrier films generally known in the art are made up of thicker ethylene-vinyl alcohol copolymer (EVOH). Single ethylene-vinyl alcohol (EVOH) is although a good oxygen barrier but it is poor in aroma barrier, mechanical properties, poor UV resistance and much high cost.

Thus there is a need of a barrier film which has excellent aroma barrier, UV resistance, oxygen barrier and mechanical properties and economical also.

SUMMARY

The present disclosure relates to a multi-layer barrier film comprising: a first layer of an ethylene vinyl alcohol (EVOH) layer or a polyamide layer having a thickness in the range of 3 micron to 15 micron; a second layer of a polyamide layer having a thickness in the range of 3 micron to 15 micron in contact with the first layer; and a third layer of an ethylene vinyl alcohol (EVOH) layer having a thickness in the range of 3 micron to 15 micron in contact with the above polyamide layer.

Another aspect of the present disclosure is a laminate comprising: an outer polyethylene film; a middle layer comprising a multi-layer barrier film in contact with the outer polyethylene film; and an inner polyethylene film in contact with the multi-layer barrier film; wherein the multi-layer barrier film comprising a first layer of an ethylene vinyl alcohol (EVOH) layer or a polyamide layer having a thickness in the range of 3 micron to 15 micron; a second layer of a polyamide layer having a thickness in the range of 3 micron to 15 micron in contact with the first layer; and a third layer of an ethylene vinyl alcohol (EVOH) layer having a thickness in the range of 3 micron to 15 micron in contact with the above polyamide layer.

Further aspect of the present disclosure is the process for the preparation of the laminate comprising the multi-layer barrier film.

Another aspect of the present disclosure is the laminated products, such as laminated tubes comprising the multi-layer barrier film in accordance with the present disclosure.

These and other features, aspects, and advantages of the present subject matter will become better understood with reference to the following description. This summary is provided to introduce a selection of concepts in a simplified form. This summary is not intended to identify key features or essential features of the disclosure, nor is it intended to be used to limit the scope of the subject matter.

BRIEF DESCRIPTION OF THE DRAWINGS

The above and other features, aspects, and advantages of the subject matter will be better understood with regard to the following description, appended claims, and accompanying drawings where:

DETAILED DESCRIPTION

Figure 1:
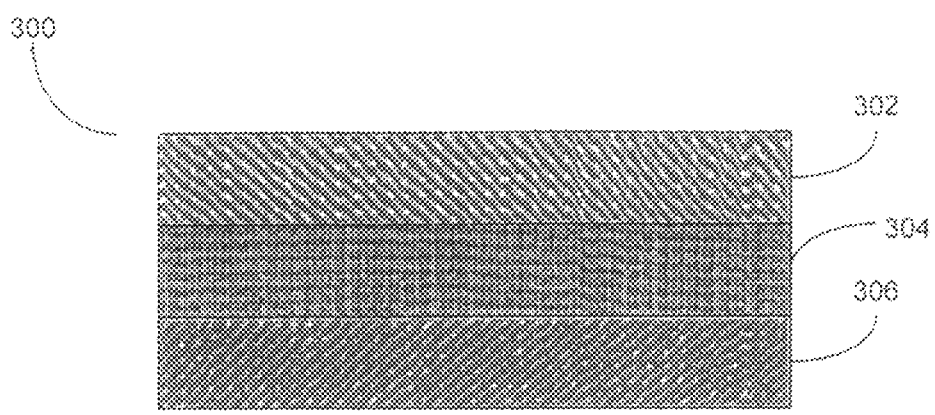
FIG. 1 illustrates a three layered barrier film 300, according to an embodiment of the present disclosure.

The present disclosure provides a multi-layer barrier film comprising: a first layer of an ethylene vinyl alcohol (EVOH) layer or a polyamide layer having a thickness in the range of 3 micron to 15 micron; a second layer of a polyamide layer having a thickness in the range of 3 micron to 15 micron in contact with the first layer; and a third layer of an ethylene vinyl alcohol (EVOH) layer having a thickness in the range of 3 micron to 15 micron. The third layer consisting of ethylene vinyl alcohol (EVOH) will be towards the product side when laminated with other polymer layers.

In one of the embodiments, the polyamide layer is an aromatic or an aliphatic polyamide layer. In another embodiment of the present disclosure the polyamide layer is selected from the group consisting of crystalline polyamide, amorphous polyamide, semi-crystalline polyamide and mixtures thereof. The polyamide polymer layer can include, but not limited to, nylon 6, nylon 6/66, nylon 6/9, nylon 6/10, nylon 6-10, nylon 11, nylon 12, amorphous nylons, MXD-6, nylon nano-composites, nylon combined with other inorganic fillers.

In an embodiment of the present disclosure at least one of the polyamide layers contains one or more UV blocking agents. An embodiment of the present disclosure also provides the aromatic polyamide to be a UV blocking agent. The UV blocking agent present in the polyamide layer is advantageously a UV-B & UV-C blocking agent, suitable for blocking rays in UV-B region (315 nm-280 nm), and UV-C region (280 nm-200 nm). The UV-B and UV-C blocking agent can be an organic chromophore. The UV-B & UV-C blocking agent that can be used in accordance with the present disclosure are notably commercially available, such as amorphous nylon to block UV B and C naturally.

In another embodiment of the present disclosure the second layer containing the polyamide layer further comprises of pigments. Pigments are preferably introduced in the layer during blown film making process in a form of Master Batch in which titanium dioxide ($TiO_2$) or calcium carbonate ($CaCO_3$) is impregnated. The introduction of pigments in the middle layer results in the polyamide layer of the multi-barrier film to be opaque.

Non limitative examples of pigments in accordance with the present disclosure include titanium dioxide ($TiO_2$), zinc disulfide ($ZnS_2$), zinc oxide (ZnO), barium sulfate ($BaSO_4$) and calcium carbonate ($CaCO_3$). The pigment may be chosen depending upon the desired color to be imparted to the laminate.

The shape of the pigment is not particularly limited; they may be notably granule, round, flaky, flat and so on. The white pigment is preferably titanium dioxide. The titanium dioxide used in the instant compositions is any of the notably commercially available, as White Master Batch for linear low density polyethylene (LLDPE) Films from local vendors or manufactured by Clarient, Ampacet, Schulman etc. and available internationally. In the present disclosure rutile titanium dioxide ($TiO_2$) is used as white pigment and would like to include calcium carbonate ($CaCO_3$) as well.

Titanium dioxide is not particularly limited, and a variety of crystalline forms such as the anatase form, the rutile form and the monoclinic type can be used. The preferably average particle size of the titanium oxide is in the range of 0.015 μm to 0.300 μm.

In another embodiment of the present disclosure wherein the polyamide layer of the multilayer barrier film is transparent. The polyamide used in the middle layer of the multilayer barrier film is amorphous polyamide. In accordance with the present disclosure, the polyamide layer comprises of blend of amorphous polyamide and crystalline polyamide.

According to the present disclosure an aromatic polyamide denotes an aromatic polyamide having UV blocking property, and which more than 50 mole % of the recurring units comprise at least one aromatic group and an amide moiety of formula (I) (aromatic recurring units, hereinafter). The aromaticity of the aromatic recurring units of an aromatic polyamide can come notably from the diacid (or derivative thereof) and/or from the diamine and/or from the aminoacid used in the polycondensation reaction.

In yet another embodiment of the present disclosure the aromatic polyamide comprises at least 20 mol % based on 100 mol % of monomers making up the polyamide, of monomers comprising an aromatic group. Although not required, such aromatic groups typically originate in a diacid monomer, and include terephthalic acid, isophthalic acid, phthalic acid, etc.

Notably commercially available UV blocking aromatic polyamide such as DuPont's "Selar PA", "Grivory G21" from EMS Chemicals, can also be used in accordance with the disclosure. In a preferred embodiment, the UV blocking aromatic polyamide is an amorphous form.

The blend of the aromatic polyamide and the aliphatic polyamide, in accordance with the present disclosure, enables better processability and provides good melt strength and tube concentricity.

According to the present disclosure an aliphatic polyamide denotes a polyamide that is compatible with aromatic polyamide contained in the middle layer which is the barrier layer of the multi-layered film. The aliphatic polyamide according to the present disclosure is present in an amount ranging from 0% to 50% on the weight of the total polyamide content in the barrier layer.

In a further embodiment of the present disclosure the aliphatic polyamide is selected from a group consisting of poly(hexamethylene adipamide) (nylon 66), poly(hexamethylene azelaamide) (nylon 69), poly(hexamethylene sebacamide) (nylon 610), poly(hexamethylene dodecanoamide) (nylon 612), poly(dodecamethylene dodecanoamide) (nylon 1212) and mixtures thereof. Examples of polyamides obtainable by (and preferably, obtained by) the auto-polycondensation reaction of an amino carboxylic acid and/or a lactam are the polycaprolactame (nylon 6), the polycaproamide and the poly(11-amino-undecano-amide).

Aliphatic polyamide such as "Ultramid B40" can be used in the barrier layer of the multi-layer film along with the aromatic polyamide according to this embodiment.

In another embodiment of the present disclosure the aliphatic polyamide and the aromatic polyamide are in a weight ratio in a range of 15:85 to 85:15, preferably 25:75 to 75:25 and most preferably 1:1.

In yet another embodiment of the present disclosure the aliphatic polyamide is semi-crystalline.

The present disclosure also provides a laminate comprising: an outer polyethylene film; a middle layer comprising a multi-layer barrier film in contact with the outer polyethylene film; and an inner polyethylene film which is in contact with the multi-layer barrier film; wherein the multi-layer barrier film comprising a first layer of an ethylene vinyl alcohol (EVOH) layer or a polyamide layer having a thickness in the range of 3 micron to 15 micron; a second layer of a polyamide layer having a thickness in the range of 3 micron to 15 micron in contact with the first layer; and a third layer of an ethylene vinyl alcohol (EVOH) layer having a thickness in the range of 3 micron to 15 micron.

In yet another embodiment of the present disclosure the outer polyethylene film and the inner polyethylene film in the multi-layered laminate are selected from the group consisting of clear polyethylene, high density polyethylene (HDPE), linear low density polyethylene polymer (LLDPE), low density polyethylene polymer (LDPE) or combination thereof. According to this embodiment the linear low density polyethylene (LLDPE) polymer in the outer polyethylene film and the inner polyethylene film can be selected from C6 (which is hexane based linear low density polyethylene (LLDPE)) such as Dow's "2645 G" and C8 (which is Octane based LLDPES) such as Dow's "5056 G", "2045", "2038", "2740" Grades. Other non limiting examples are metallocene polyethylene polymer Like Exxon Mobils "Exceed"

family (such as "1018 CA", "1327 CA"), "Enable 3505" polymers from metallocene grades, Dow's "Elite" grade Metallocene linear low density polyethylene (LLDPE) family. The similar Octane or Hexane based linear low density polyethylene (LLDPE) polymer grades from other polymer manufacturers, such as Mitsui Chemicals' C6 (Octane based linear low density polyethylene (LLDPE))—Ulzex grade or (hexane based) metallocene 4020 L Evolue grades etc. also can be used.

The low density polyethylene (LDPE) in accordance with the present disclosure can have density in the range of 0.918 g/cc to 0.935 g/cc. The low density polyethylene (LDPE) in accordance with the present disclosure can have density of 0.918 g/cc., 0.920 g/cc, 0.925 g/cc, 0.930 g/cc or 0.935 g/cc. In an embodiment the preferred density of low density polyethylene (LDPE) is 0.918 g/cc.

The density of linear low density polyethylene (LLDPE) in the multi-layered laminate of the present disclosure is in the range of 0.912 g/cc to 0.940 g/cc. The low density polyethylene (LDPE) in accordance with the present disclosure can have density 0.912 g/cc., 0.912 g/cc, 0.917 g/cc, 0.922 g/cc, 0.927, 0.932 g/cc, 0.937 g/cc or 0.940 g/cc. In an embodiment the preferred density of low density polyethylene (LDPE) is 0.927 g/cc. These may be Metallocene linear low density polyethylene (LLDPE) or linear low density polyethylene (LLDPE) formed using other catalyst such as Ziegler-Natta.

In a further embodiment of the present disclosure the outer polyethylene film and the inner polyethylene film contain an additive. According to this embodiment, the additive is one of the general additives known in the pertinent art to modify the properties of the polymer. Such additives can be stabilizers, antioxidants, modifiers, color pigments colorants, and in combination thereof. In an embodiment, the additive is a color pigment or colorant. The color pigments or colorants used can be commercially available black master batches, white master batches and other color master batches.

In an embodiment of the present disclosure the outer polyethylene film and the inner polyethylene film is a multi-layered polyethylene film. According to this embodiment the multi-layered polyethylene film can be a two to six layered film. The multi-layered polyethylene film disclosed in the present disclosure can be a two layered film, a three layered film, a four layered film, a five layered film or a six layered film.

According to the foregoing embodiments of the present disclosure the outer polyethylene layer in the multi-layered laminate serves as the print layer having thickness in the range of 5 micron to 50 micron. The inner polyethylene layer in the multi-layered laminate serves as the sealant layer having a thickness in the range of 30 micron to 100 micron.

Generally a Tie, or adhesive layers is usually required to adhere together various layers of the multi-layer laminate structure. Material for tie or adhesive layer is selected based on the composition of the outer layer and the next layer. In an exemplary embodiment of the present disclosure, the tie or adhesive layer may be a co-extrusion of the low density polyethylene (LDPE) and/or linear low density polyethylene (LLDPE). The tie or adhesive layer may alternatively comprise any of the various other polymeric adhesives commonly used in the art of making multi-layer laminates.

The tie layer used in between the polyethylene based layer is generally made up of anhydride grafted polymer compound or clear lower density polyethylene or linear low density polyethylene polymer. The thickness of each tie layer is generally in the range of 4 micron to 50 micron.

In yet another embodiment of the present disclosure the laminate has thickness in the range of 90 micron to 525 micron. The polyethylene present in the multilayer outer film and the multilayer inner film impart mechanical strength and stiffness to the laminate by virtue of the inherent polymer structures. Recently, to add to the aesthetic appeal of the laminates with cost effectiveness, a sharp increase in the demand for thin, yet durable laminates has been witnessed. However, a decrease in the thickness of the laminate having polyethylene in the outer and the inner layers of the laminate adversely affects mechanical properties, such as stiffness, of the laminate and resilience properties in the tube containers.

The use of polyethylene in the skin layers of the outer layer allows easy binding of the various layers of the laminate and also allows for convenient binding and sealing of the laminate when storage containers are produced using the laminate.

In still another embodiment, a laminate comprising: an outer polyethylene layer; a middle layer comprising a multilayer barrier film, wherein the multi-layer barrier film is in contact with the outer polyethylene film; and an inner polyethylene film which is in contact with the multi-layer barrier film, wherein the outer polyethylene film comprising an outer polyethylene layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof having a thickness in the range of 5 micron to 50 micron; a body layer comprising of high density polyethylene (HDPE) or polypropylene (PP) or linear low density polyethylene (LLDPE) or blend of color master batch or blend of high density polyethylene (HDPE) and linear low density polyethylene (LLDPE) or blend of polypropylene (PP) and linear low density polyethylene (LLDPE) or combination thereof having a thickness in the range of 10 micron to 100 micron; a laminating layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof having a thickness in the range of 5 micron to 50 micron; a first tie layer having a thickness in the range of 10 micron to 50 micron; a skin layer comprising of clear low density polyethylene (LDPE) or linear low density polyethylene (LLDPE) or blend of colorant and low density polyethylene (LDPE) or linear low density polyethylene (LLDPE) or combination thereof having a thickness in the range of 5 micron to 25 micron; a second tie layer having a thickness in the range of 4 micron to 15 micron; and the inner polyethylene film comprising: a third tie layer having a thickness in the range of 4 micron to 15 micron; a skin layer comprising of clear low density polyethylene (LDPE) or linear low density polyethylene (LLDPE) or blend of colorant and low density polyethylene (LDPE) or linear low density polyethylene (LLDPE) or combination thereof having a thickness in the range of 5 micron to 25 micron in contact with the third tie layer; a fourth tie layer having a thickness in the range of 10 micron to 50 micron in contact with the skin layer; and an inner polyethylene layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof having a thickness in the range of 30 micron to 100 micron in contact with the fourth tie layer.

In an embodiment of the present disclosure, FIG. 1 illustrates an exemplary structure of the multilayer barrier film 300, in accordance with an embodiment of the present disclosure. In said embodiment, as mentioned earlier, the multilayer barrier film 300 is formed having a three-layered structure. The middle layer 304 comprises of polyamide or amorphous polyamide or blends of polyamide and amorphous polyamide and optionally pigments. The first layer 302 comprises ethylene vinyl alcohol (EVOH) or a polyamide. The third layer 306 comprises 100% ethylene vinyl alcohol (EVOH), which provides a barrier to atmospheric gases and moisture and also exhibits aroma preserving properties. According to this embodiment, the thickness of the third layer 306 ranges from 3 micron to 15 micron, the thickness of middle layer 304 ranges from 3 micron to 15 micron, and the thickness of first layer 302 ranges from 3 micron to 15 micron.

Figure 2:
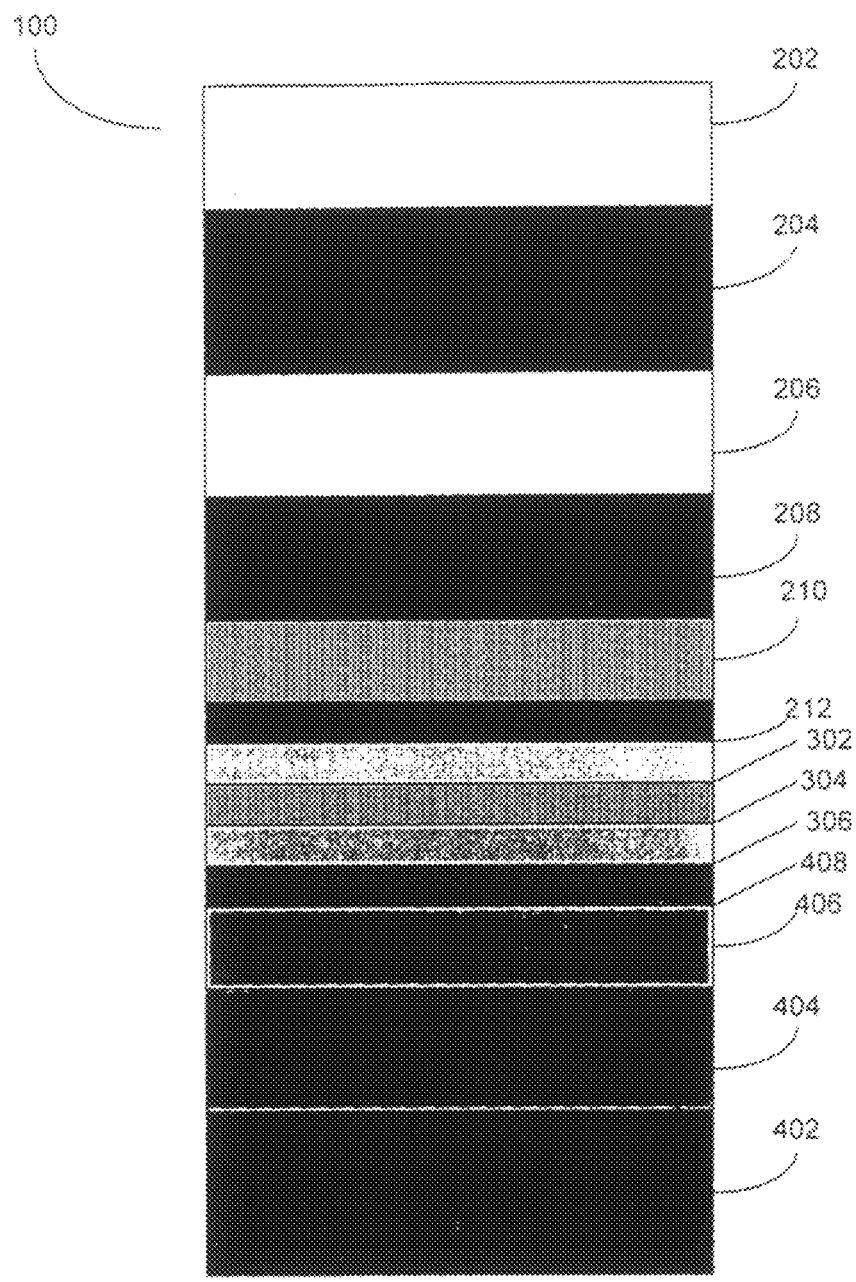
FIG. 2 illustrates a thirteen layer laminate 100, according to an embodiment of the present disclosure.

In another embodiment of the present disclosure, FIG. 2 illustrates an exemplary structure of the laminate 100 comprising the multilayer barrier film 300. In an embodiment, the thickness of the laminate 100 ranges from about 90 micron to about 525 micron. Further, as a result of the presence of the multilayer barrier film 300, in the laminate 100, the laminate exhibits excellent barrier and product keeping properties throughout the designated shelf life.

In laminate 100, the multilayer outer film comprises an outermost printing layer 202 of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof; a body layer 204 comprising high density polyethylene (HDPE) or polypropylene (PP) or low density polyethylene (LLDPE) or blend of color master batch or blend of high density polyethylene (HDPE) and linear low density polyethylene (LLDPE) or blend of polypropylene (PP) and linear low density polyethylene (LLDPE) or combination thereof; a laminating layer 206 comprising clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof; and a skin layer 210 comprising clear low density polyethylene (LDPE) or linear low density polyethylene (LLDPE) or blend of colorant and low density polyethylene (LDPE) or linear low density polyethylene (LLDPE) or combination thereof.

In yet another embodiment of the present disclosure the thickness of the outer most printing layer 202 ranges from 5 micron to 50 micron, the thickness of body layer 204 ranges from 10 micron to 100 micron, the thickness of laminating layer 206 ranges from 5 micron to 50 micron, and the thickness of skin layer 210 ranges from 5 micron to 25 micron.

In laminate 100, the multilayer inner film comprises an innermost sealant layer 402 of Clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof; a skin layer 406 comprising clear low density polyethylene (LDPE) or linear low density polyethylene (LLDPE) or blend of colorant and low density polyethylene (LDPE) or linear low density polyethylene (LLDPE) or combination thereof. The inner most sealant layer 402 is bonded to the skin layer 406 by a tie layer 404, and the skin layer 406 is bonded to the inner barrier layer 306 by using another tie layer 408.

In a further embodiment of the present disclosure the inner most sealant layer 402 is a three layered structure.

In still another embodiment of the present disclosure, the thickness of the innermost sealant layer 402 ranges from 30 micron to 100 micron, the thickness of skin layer 406 ranges from 5 micron to 25 micron, the thickness of tie layer 404 ranges from 10 micron to 50 micron, and the thickness of another tie layer 408 ranges from 4 micron to 15 micron.

The laminating layer 206 and the skin layer 210 is bonded together using a first adhesive layer or a tie layer 208; and in a similar manner, the skin layer 210 is bonded to the first layer 302, of the multilayer barrier film, using a second adhesive layer or tie layer 212. Further to this, in an embodiment the skin layer 406 is bonded to the third layer 306, using third adhesive or tie layer 408; and in a similar manner the inner most sealant layer 402 is bonded to the skin layer 406 using fourth adhesive layer or tie layer 404. As a result of bonding of the different layers, the laminate 100 is obtained.

The tie layers in the multi-layered laminate of the present disclosure comprises of layers that generally binds the barrier layer to the outer and the inner layers in the laminate. Depending on the type of the barrier layer, the tie layer can be any tie layer that is suitable for the said bonding.

In an embodiment, a laminated tube can be made of the laminate.

In another embodiment of the present disclosure, the laminate 100 is prepared by a Blown Film extrusion or Cast film extrusion or combination of both.

The present disclosure further provides a process for preparation of the laminate, said process comprising laminating the multilayer outer polyethylene film, multi-layer barrier film and multilayer inner polyethylene film through extrusion coating and lamination process to obtain the laminate according to the present disclosure.

Another embodiment of the present disclosure provides a process for preparation of laminate wherein the each layer of the multilayer outer polyethylene film and the multilayer inner polyethylene film are fabricated separately and kept for conditioning for a period in the range of 8 hours to 72 hours at a temperature in the range of 20° C. to 30° C. In a similar manner the layers of multi-layer barrier film are fabricated separately and kept for conditioning for a period in the range of 8 hours to 72 hours at a temperature in the range of 20° C. to 30° C. The process used for fabricating the layers is selected from Cast film extrusion and blown film extrusion or combination thereof.

Blown film extrusion is a technology that is the most common method for making plastic films, especially for the packaging industry. The process involves extruding a tube of molten polymer through a die and inflating to several times its initial diameter to form a thin film bubble. This bubble is then collapsed and used as a lay-flat film or can be made into bags. Usually polyethylene is used with this process, and other materials can be used as blends with these polymers in production of multilayer blown films.

Typically, blown film extrusion is carried out vertically upwards. This procedure consists of four main steps:

1. The polymer material is taken in a pellet form, which are successively compacted and melted to form a continuous, viscous liquid. This molten plastic is then forced, or extruded, through an annular die.

2. Air is injected through a hole in the center of the die and the pressure causes the extruded melt to expand into a bubble. The air entering the bubble replaces air leaving it, so that even and constant pressure is maintained to ensure uniform thickness of the film.

3. The bubble is pulled continually upwards from the die and a cooling ring blows air onto the film. The film can also be cooled from the inside using internal bubble cooling. This reduces the temperature inside the bubble, while maintaining the bubble diameter.

4. After solidification at the frost line, the film moves into a set of nip rollers which collapse the bubble and flatten it into two flat film layers. The puller rolls pull the film onto windup rollers. The film passes through idler rolls during this process to ensure that there is uniform tension in the film. Between the nip rollers and the windup rollers, the film may pass through a treatment centre, depending on the application. During this stage, the film may be slit to form one or two films, or surface treated Cast film extrusion is also a technology that is the most common method for making plastic films, especially for the packaging industry. In cast film extrusion the polymer is melted onto a Chilled drum prior to haul off and winding, the process offers much higher outputs for bulk production of thin polymer films.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

A layer of ethylene vinyl alcohol or polyamide is in contact with a layer of polyamide or amorphous polyamide or blends of polyamide and amorphous polyamide and optionally pigments. A layer of 100% Ethylene vinyl alcohol (EVOH) which serves a barrier to atmospheric gases and moisture is in contact with the above polyamide layer. These three layers comprise a multi-layer barrier film wherein each layer has thickness in the range of 3 micron ($\mu$) to 15 micron ($\mu$).

The structure of the multi-layer barrier film is given below:

3$\mu$ to 15$\mu$ EVOH or polyamide 3$\mu$ to 15$\mu$ polyamide 3$\mu$ to 15$\mu$ EVOH Example 2

A multi-layered laminate comprises of a multi-layered outer layer, a multi-layered middle layer and a multi-layered inner layer. The multi-layered outer layer comprises of an outermost printing layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof of thickness in the range of 5 micron to 50 micron is in contact with a body layer comprising of high density polyethylene (HDPE) or polypropylene (PP) or linear low density polyethylene (LLDPE) or blend of color master batch or blend of high density polyethylene (HDPE) and linear low density polyethylene (LLDPE) or blend of polypropylene (PP) and linear low density polyethylene (LLDPE) or combination thereof of thickness in the range of 10 micron to 100 micron. The body layer is contact with a laminating layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof of thickness in the range of 5 micron to 50 micron. The laminating layer is bound using a tie layer to a skin layer comprising of clear low density polyethylene (LDPE) or linear low density polyethylene (LLDPE) or blend of colorant and low density polyethylene (LDPE) or linear low density polyethylene (LLDPE) or combination thereof of thickness in the range of 5 micron to 25 micron. The skin layer in turn is bound to the multi-barrier film as described in example 1 using a tie layer. The inner barrier layer containing 100% of ethylene vinyl alcohol (EVOH) in the multi-layer barrier film is bound to a skin layer comprising of clear low density polyethylene (LDPE) or linear low density polyethylene (LLDPE) or blend of colorant and low density polyethylene (LDPE) or linear low density polyethylene (LLDPE) or combination thereof of thickness in the range of 5 micron to 25 micron using a tie layer of thickness in the range of 4 micron to 15 micron. The skin layer is bound to a sealant layer comprising of clear polyethylene film or low density polyethylene (LDPE) or linear low density polyethylene (LLDPE) or blend of high density polyethylene (HDPE) and linear low density polyethylene (LLDPE) or blend of low density polyethylene (LDPE) and linear low density polyethylene (LLDPE) or combination thereof of thickness in the range of 30 micron to 100 micron, using a tie layer of thickness in the range of 10 micron to 50 micron.

The structure of the multi-layered laminate is given below:

5$\mu$ to 50$\mu$ outer printing layer// 10$\mu$ to 100$\mu$ body layer// 5$\mu$ to 50$\mu$ laminating layer // 10$\mu$ to 50$\mu$ first tie layer // 5$\mu$ to 25$\mu$ skin layer// 4$\mu$ to 15$\mu$ second tie layer // 3$\mu$ to 15$\mu$ EVOH or polyamide // 3$\mu$ to 15$\mu$ polyamide// 3$\mu$ to 15$\mu$ EVOH // 4$\mu$ to 15$\mu$ third tie layer// 5$\mu$ to 25$\mu$ skin layer// 10$\mu$ to 50$\mu$ fourth tie layer// 30$\mu$ to 100$\mu$ inner sealant layer Example 3

A multi-layered laminate comprises of a multi-layered outer layer, a multi-layered middle layer and a multi-layered inner layer. The total thickness of the laminate is 97$\mu$ with 5$\mu$ outer printing layer// 10$\mu$ body layer// 5$\mu$ laminating layer // 10$\mu$ first tie layer // 5$\mu$ skin layer// 4$\mu$ second tie layer // 3$\mu$ EVOH or polyamide // 3$\mu$ polyamide// 3$\mu$ EVOH // 4$\mu$ third tie layer// 5$\mu$ skin layer// 10$\mu$ fourth tie layer// 30$\mu$ inner sealant layer.

Example 4

A multi-layered laminate comprises of a multi-layered outer layer, a multi-layered middle layer and a multi-layered inner layer. The total thickness of the laminate is 97$\mu$ with 5$\mu$ outer printing layer// 10$\mu$ body layer// 5$\mu$ laminating layer // 10$\mu$ first tie layer // 5$\mu$ skin layer// 4$\mu$ second tie layer //

3μ EVOH // 3μ polyamide// 3μ EVOH // 4μ third tie layer// 5μ skin layer// 10μ fourth tie layer// 30μ inner sealant layer.

Example 5

A multi-layered laminate comprises of a multi-layered outer layer, a multi-layered middle layer and a multi-layered inner layer. The total thickness of the laminate is 525μ with 50μ outer printing layer// 100μ body layer// 50μ laminating layer // 50μ first tie layer // 25μ skin layer// 15μ second tie layer // 15μ EVOH or polyamide // 15μ polyamide// 15μ EVOH // 15μ third tie layer// 25μ skin layer// 50μ fourth tie layer// 100μ inner sealant layer.

Example 6

A multi-layered laminate comprises of a multi-layered outer layer, a multi-layered middle layer and a multi-layered inner layer. The total thickness of the laminate is 525μ with 50μ outer printing layer// 100μ body layer// 50μ laminating layer // 50μ first tie layer // 25μ skin layer// 15μ second tie layer // 15μ EVOH // 15μ polyamide// 15μ EVOH // 15μ third tie layer// 25μ skin layer// 50μ fourth tie layer// 100μ inner sealant layer Advantages:

The previously described versions of the subject matter and its equivalent thereof have many advantages, including those which are described below:

1. The present disclosure provides multi-layered polyethylene laminates with a multi-layer barrier film which when made into articles excellent aroma barrier, UV resistance and oxygen barrier properties.
2. The present disclosure enhances the product appeal.
3. The present disclosure also provides multi-layered polyethylene laminates with a multi-layer barrier film in a cost effective way.

Although the subject matter has been described in considerable detail with reference to certain preferred embodiments thereof, other embodiments are possible. As such, the spirit and scope of the disclosure should not be limited to the description of the preferred embodiment contained therein.

I claim:

1. A multi-layer barrier film comprising:
   a first layer of an ethylene vinyl alcohol (EVOH) layer having a thickness in the range of 3 micron to 15 micron;
   a second layer comprising a polyamide layer having a thickness in the range of 3 micron to 15 micron in contact with the first layer; and
   a third layer of an ethylene vinyl alcohol (EVOH) layer having a thickness in the range of 3 micron to 15 micron;
   wherein the polyamide layer contains one or more UV blocking agents, the one or more UV blocking agents comprising amorphous nylon.
2. The multi-layer film as claimed in claim 1, wherein the polyamide layer comprises an aromatic polyamide, an aliphatic polyamide, or a blend thereof.
3. The multi-layer film as claimed in claim 1, wherein the polyamide layer is selected from the group consisting of crystalline polyamide, amorphous polyamide, semi-crystalline polyamide and mixtures thereof.
4. The multi-layer film as claimed in claim 1, wherein the second layer further comprises of pigments.
5. The multi-layer film as claimed in claim 2, wherein the aliphatic polyamide is selected from a group consisting of poly(hexamethylene adipamide), poly(hexamethylene aze-laamide), poly(hexamethylene sebacamide), poly(hexamethylene dodecanoamide) poly(dodecamethylene dodecanoamide) and mixtures thereof.
6. The multi-layer film as claimed in claim 2, wherein the polyamide layer comprises the blend of the aliphatic polyamide and the aromatic polyamide in a weight ratio in a range of 15:85 to 85:15.
7. The multi-layer film as claimed in claim 2, wherein the aliphatic polyamide is semi-crystalline.
8. A laminate comprising:
   an outer polyethylene film;
   a middle layer comprising a multi-layer barrier film in contact with the outer polyethylene film, the multi-layer barrier film comprising:
      a first layer in contact with the outer polyethylene film, the first layer comprising an ethylene vinyl alcohol (EVOH) layer or a polyamide layer having a thickness in the range of 3 micron to 15 micron;
      a second layer comprising a polyamide layer having a thickness in the range of 3 micron to 15 micron in contact with the first layer; and
      a third layer of an ethylene vinyl alcohol (EVOH) layer having a thickness in the range of 3 micron to 15 micron in contact with the second layer; and
   an inner polyethylene film which is in contact with the third layer of the multi-layer barrier film;
   wherein the polyamide layer contains one or more UV blocking agents, the one or more UV blocking agents comprising amorphous nylon.
9. The laminate as claimed in claim 8, wherein the outer polyethylene film and the inner polyethylene film are selected from a group consisting of polyethylene that is clear, high density polyethylene (HDPE), linear low density polyethylene polymer (LLDPE), low density polyethylene polymer (LDPE) and combinations thereof.
10. The laminate as claimed in claim 9, wherein the density of the low density polyethylene (LDPE) is in the range of 0.918 g/cc to 0.935 g/cc.
11. The laminate as claimed in claim 9, wherein the density of the linear low density polyethylene (LLDPE) is in the range of 0.912 g/cc to 0.940 g/cc.
12. The laminate as claimed in claim 8, wherein the outer polyethylene film and the inner polyethylene film contain an additive which is selected from a group consisting of stabilizers, antioxidants, modifiers, colour pigments, colourant, and in combination thereof.
13. The laminate as claimed in claim 8 wherein the outer polyethylene film or the inner polyethylene film is a multi-layered polyethylene film.
14. The laminate as claimed in claim 13, wherein the multi-layered polyethylene film is a two to six layered film.
15. The laminate as claimed in claim 8, wherein the thickness of the outer polyethylene film is in the range of 5 micron to 50 micron.
16. The laminate as claimed in claim 8, wherein the thickness of the inner polyethylene film is in the range of 30 micron to 100 micron.
17. The laminate as claimed in claim 8 wherein said laminate has a thickness in the range of 90 micron to 525 micron.
18. The laminate as claimed in claim 8, wherein the outer polyethylene film comprises:
   a printing layer comprising of at least one of clear polyethylene film, low density polyethylene (LDPE), linear low density polyethylene (LLDPE), blend of high density polyethylene (HDPE) and linear low density polyethylene (LLDPE), blend of low density polyethylene (LDPE) and linear low density polyethylene (LLDPE), or combination thereof, and having a thickness in the range of 5 micron to 50 micron;
a body layer comprising of at least one of high density polyethylene (HDPE), polypropylene (PP), linear low density polyethylene (LLDPE), blend of color master batch, blend of high density polyethylene (HDPE) and linear low density polyethylene (LLDPE), blend of polypropylene (PP) and linear low density polyethylene (LLDPE), or combination thereof, and having a thickness in the range of 10 micron to 100 micron;
a laminating layer comprising of at least one of clear polyethylene film, low density polyethylene (LDPE), linear low density polyethylene (LLDPE), blend of high density polyethylene (HDPE) and linear low density polyethylene (LLDPE), blend of low density polyethylene (LDPE) and linear low density polyethylene (LLDPE), or combination thereof, and having a thickness in the range of 5 micron to 50 micron;
a first tie layer having a thickness in the range of 10 micron to 50 micron;
a first skin layer comprising of at least one of clear low density polyethylene (LDPE), linear low density polyethylene (LLDPE), blend of colorant and low density polyethylene (LDPE), blend of colorant and linear low density polyethylene (LLDPE), or combination thereof, and having a thickness in the range of 5 micron to 25 micron;
a second tie layer having a thickness in the range of 4 micron to 15 micron; and
wherein the inner polyethylene film comprises:
a third tie layer having a thickness in the range of 4 micron to 15 micron;
a second skin layer comprising of at least one of clear low density polyethylene (LDPE), linear low density polyethylene (LLDPE), blend of colorant and low density polyethylene (LDPE), blend of colorant and linear low density polyethylene (LLDPE), or combination thereof, and having a thickness in the range of 5 micron to 25 micron in contact with the third tie layer;
a fourth tie layer having a thickness in the range of 10 micron to 50 micron in contact with the second skin layer; and
an inner polyethylene layer comprising of at least one of clear polyethylene film, low density polyethylene (LDPE), linear low density polyethylene (LLDPE), blend of high density polyethylene (HDPE) and linear low density polyethylene (LLDPE), blend of low density polyethylene (LDPE) and linear low density polyethylene (LLDPE), or combination thereof, and having a thickness in the range of 30 micron to 100 micron in contact with the fourth tie layer.

19. A laminated tube made of the laminate as claimed in claim 8.

20. A process for the preparation of the laminate as claimed in claim 8, said process comprising:
utilizing an extrusion coating and lamination process to laminate the outer polyethylene film, the multi-layer barrier film, and the inner polyethylene film to obtain the laminate.

21. The process as claimed in claim 20, the process further comprising:
fabricating each layer of the outer polyethylene film, each layer of the inner polyethylene film separately, and each layer of the middle layer separately by using cast film extrusion, blown film extrusion, or combination thereof; and
conditioning each layer of the outer polyethylene film, each layer of the inner polyethylene film, and each layer of the middle layer separately for a period of 8 hours to 72 hours at a temperature in the range of 20° C. to 30° C.

* * * * *